United States Patent
Wiemers et al.

(10) Patent No.: US 8,257,592 B2
(45) Date of Patent: Sep. 4, 2012

(54) BIOLOGICAL WASTEWATER TREATMENT APPARATUS AND METHODS USING MOVING BELT CONTRACTOR

(75) Inventors: Reginald A. Wiemers, Littleton, CO (US); Robert Kohlheb, Göttingen (DE); Gyorgy Lipovszki, Budapest (HU)

(73) Assignee: Rockwater Resource, LLC, Denver, CO (US)

( * ) Notice: Subject to any disclaimer, the term of this patent is extended or adjusted under 35 U.S.C. 154(b) by 294 days.

(21) Appl. No.: 12/452,775

(22) PCT Filed: Jul. 31, 2008

(86) PCT No.: PCT/US2008/009229
§ 371 (c)(1),
(2), (4) Date: Jan. 22, 2010

(87) PCT Pub. No.: WO2009/017773
PCT Pub. Date: Feb. 5, 2009

(65) Prior Publication Data
US 2010/0116734 A1    May 13, 2010

(51) Int. Cl.
*C02F 3/08* (2006.01)
(52) U.S. Cl. ......... 210/614; 210/619; 210/150; 210/387
(58) Field of Classification Search .................. 210/614, 210/615, 619, 150, 151, 387
See application file for complete search history.

(56) References Cited

U.S. PATENT DOCUMENTS

| | | | |
|---|---|---|---|
| 3,466,241 A * | 9/1969 | Simpson ........................ 210/151 |
| 4,137,062 A * | 1/1979 | Mullerheim et al. ......... 210/387 |
| 4,177,147 A * | 12/1979 | Roberts ........................ 210/151 |
| 4,351,721 A | 9/1982 | Frandsen |
| 4,504,393 A * | 3/1985 | Davies ........................ 210/614 |
| 4,530,763 A * | 7/1985 | Clyde et al. .................... 210/619 |
| 4,600,694 A * | 7/1986 | Clyde ............................ 210/151 |
| 4,676,892 A * | 6/1987 | Grabowski .................... 210/150 |
| 4,826,596 A | 5/1989 | Hirs |
| 4,897,356 A * | 1/1990 | Simpson et al. .............. 210/150 |
| 4,919,825 A * | 4/1990 | Croket ........................... 210/387 |
| 4,999,302 A * | 3/1991 | Kahler et al. ................. 210/619 |
| 5,256,570 A * | 10/1993 | Clyde ........................... 210/150 |
| 6,241,900 B1 * | 6/2001 | Nakamura et al. ............ 210/387 |
| 6,245,236 B1 * | 6/2001 | Schenck ....................... 210/150 |
| 6,572,774 B2 * | 6/2003 | Ricketts ........................ 210/151 |
| 7,156,986 B2 * | 1/2007 | Warrow ........................ 210/150 |
| 7,544,287 B2 * | 6/2009 | Harris ........................... 210/150 |
| 7,820,048 B2 * | 10/2010 | Weissman ..................... 210/619 |
| 2004/0060862 A1* | 4/2004 | Savage et al. ................. 210/618 |
| 2005/0247623 A1* | 11/2005 | Petrone ......................... 210/151 |

FOREIGN PATENT DOCUMENTS

| DE | 4117056 A1 | 11/1992 |
|---|---|---|
| GB | 1324358 A | 7/1973 |
| GB | 1333061 A | 10/1973 |

* cited by examiner

*Primary Examiner* — Christopher Upton
(74) *Attorney, Agent, or Firm* — Harold A. Burdick

(57) ABSTRACT

A compact biological treatment assembly, apparatus and methods are disclosed, the apparatus including a movable belt biological contactor having selected microbial cultures established thereon. The apparatus further includes a tank having a volume for receipt of wastewater to be treated, first and second drums positioned at the tank each connected to an end of the belt contactor, and a motor or motors together with a controller for rotating the drums cooperatively to move the belt contactor between the drums thereby coiling and uncoiling the belt contactor on the drums.

23 Claims, 16 Drawing Sheets

BIOLOGICAL WASTEWATER TREATMENT APPARATUS AND METHODS USING MOVING BELT CONTRACTOR

FIELD OF THE INVENTION

This invention relates to effluence treatment for removal of nonsettling solids and dissolved organic load and, more particularly, relates to such biological treatment employing moving biological contactors.

BACKGROUND OF THE INVENTION

Most industrial and municipal processes require water treatment facilities to treat effluents returned to the environment. Such facilities typically represent a significant investment by the business/community, and the performance of the facility (or failure thereof) can seriously impact ongoing operations financially and in terms of operational continuity.

Moreover, not all effluent treatment requires the same technologies. Industrial effluents (such as is found at coal bed methane facilities or oil production sites, for example) all have different particulate, pollutant and/or biomass content inherent to both the industrial processes as well as the particular water and soil conditions found at the site. Municipal requirements would likewise vary depending on desired end-of-pipe quality and use (and again depending on the feed water present at the site).

The goal of all biological wastewater treatment systems is to remove the non-settling solids and the dissolved organic load from the wastewater by using microbial populations. The microorganisms used are responsible for the degradation of organic matter and the stabilization of organic wastes. Various effluent treating systems use aerobic microorganisms (i.e., microorganisms that require oxygen for their metabolism). These microorganisms use the organic content, including anaerobic iron accepting bacteria, of the wastewater as an energy source to grow.

One specific biological medium used consists of genetically altered aerobic microorganism cultures. The organic load of this treatment system is incorporated in part as biomass by the microbial populations, and almost all the remainder is liberated as gas. Unless the cell mass formed during the biological treatment is removed from the wastewater, the treatment is largely incomplete because the biomass itself will appear as organic load in the effluent and the only pollution reduction accomplished is that fraction liberated as gas.

Heretofore utilized biological contactor systems have included rotating biological contactors employing a biological film supported on a rotating plastic material disk or disks in a trough through which settled sewage flows. The disks are only partially submerged and, therefore, the biomass is subject to periodical removal from the wastewater flow (required since the oxygen needed for respiration is extracted from atmospheric air). Excess biomass is continually sloughed from the support disks and treated effluent must therefore be discharged into a secondary clarifier to settle entrained solids prior to further treatment.

Biological cleaning and recycling of aqueous based effluence from various mining, manufacturing and/or municipal facilities is handled in a variety of ways. For example, outflow from produced water from coalbed methane wells is directed to stationary, multi-chamber anaerobe denitrification septic tank systems for the reduction of the chemical oxygen demand. This approach requires a large commitment for permanent installation and construction. This approach is thus usually associated with substantial capital and fabricating costs as well as significant operating cost.

Heretofore known systems and methods for biological wastewater treatment are also often highly energy consumptive, noisy and/or smelly, space consuming and difficult to clean and/or maintain. Moreover, reliability and stability of such systems could be improved, as could their adaptability to automation. Surplus activated sludge generation should also be reduced. Therefore, improved biological treatment technologies could still be utilized.

SUMMARY OF THE INVENTION

This invention provides biological wastewater treatment assembly, apparatus and methods using a moving biological contactor. The moving contactor apparatus is configured as a moving belt. The assembly, apparatus and methods of this invention reduce manufacturing and operating costs, and are energy efficient, reliable and stable. The apparatus and methods are run relatively odor free and quiet, and are easy to clean and maintain. Assembly installation requires a relatively small footprint and is easily automated. Surplus activated sludge generated is greatly reduced.

The apparatus includes a tank having a volume for receiving wastewater for treatment and a contactor including a porous fabric media surface for receipt and growth of selected microbial cultures thereon. Structure is provided to move the surface of the contactor through the volume.

The contactor is preferably a belt with first and second ends, the structure including first and second drums positioned at the tank. The ends of the belt contactor are connected with the drums. Motor(s) and/or other means are utilized for rotating the drums to coil and uncoil the belt contactor on the drums, with the first drum coiling the belt contactor and the second drum uncoiling the belt contactor in a first direction of rotational operation, the reverse occurring in a second direction of rotational operation.

The methods of this invention include the steps of moving water to be treated into a volume and moving material having a porous fabric media surface with selected microbial cultures established thereon between first and second coils adjacent to the volume. Part of the surface of the material is exposed to the water to be treated during material movement, and another part of the surface of the material is exposed at each of the coils to ambient air.

It is therefore an object of this invention to provide improved biological wastewater treatment assembly, apparatus and methods.

It is another object of this invention to provide improved wastewater treatment assembly, apparatus and methods using a moving biological contactor.

It is another object of this invention to provide biological wastewater treatment assembly, apparatus and methods using a moving belt contactor.

It is still another object of this invention to provide improved wastewater treatment assembly, apparatus and methods using a moving biological contactor that reduces manufacturing and operating costs, and are energy efficient, reliable and stable.

It is yet another object of this invention to provide improved wastewater treatment assembly, apparatus and methods using a moving biological contactor that run relatively quiet and odor free, and are easy to clean and maintain.

It is still another object of this invention to provide improved wastewater treatment assembly, apparatus and methods using a moving biological contactor that require a relatively small footprint, that are easily automated and that generates a reduced surplus of activated sludge.

It is still another object of this invention to provide an apparatus for biological wastewater treatment that includes a volume for receiving wastewater for treatment, a contactor including a porous fabric media surface for receipt and growth of selected microbial cultures thereon, and structure moving the surface of the contactor through the volume.

It is yet another object of this invention to provide an assembly for biological wastewater treatment that includes a tank having a volume for receipt of wastewater to be treated, a belt contactor including first and second ends and a surface therebetween for establishing selected microbial cultures thereon, first and second drum structures positioned at the tank, each for holding a different one of the ends of the belt contactor, and means for rotating the drum structures in first and second directions to coil and uncoil the belt contactor on the drum structures, the first drum structure coiling the belt contactor and the second drum structure uncoiling the belt contactor in the first direction of rotational operation, the reverse occurring in the second direction of rotational operation, whereby the belt contactor surface is moved through the tank volume on the first and second drum structures.

It is yet another object of this invention to provide a method for biological wastewater treatment that includes the steps of moving water to be treated into a volume, moving material having a porous fabric media surface with selected microbial cultures established thereon between first and second coils adjacent to the volume, exposing part of the surface of the material to the water to be treated during material movement, and exposing another part of the surface of the material at each of the coils to ambient air.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

FIGS. 1 through 6 illustrate various embodiments of assembly 5401, an assembly adapted for treatment of biological wastewater utilizing a rotating biological contactor. Assembly 5401 may be used as a treatment to remove contaminants such as emulsified oil/grease, anaerobic iron accepting bacteria, as well as trace amounts of dissolved iron, manganese and methane gas from an influent feed water stream.

Assembly 5401 of this invention utilizes immersed conveyor apparatus 5403 holding a coil 5404 of woven (and thus porous) plastic fabric media formed as a conveyor belt fabric material 5601/5603/5605 in a long sheet (for example, 1,500 m×1 m), the various embodiments of which are shown in FIG. 56. The conveyor belt could be coated with ZEORAP using a fluidized bed process (for example, silicon fog) prior to seeding with microbial cultures. This provides faster and stronger adherence of the seedling to the rough ZEORAP surface structure. The ZEORAP becomes a catalyst for the conversion of organic and inorganic contaminants. The coil is spirally wound (Archimedes' spiral) around drum 5405 to which the inner coil material end is fastened, the other coil material end fastened to drum 5407.

Figure 1:
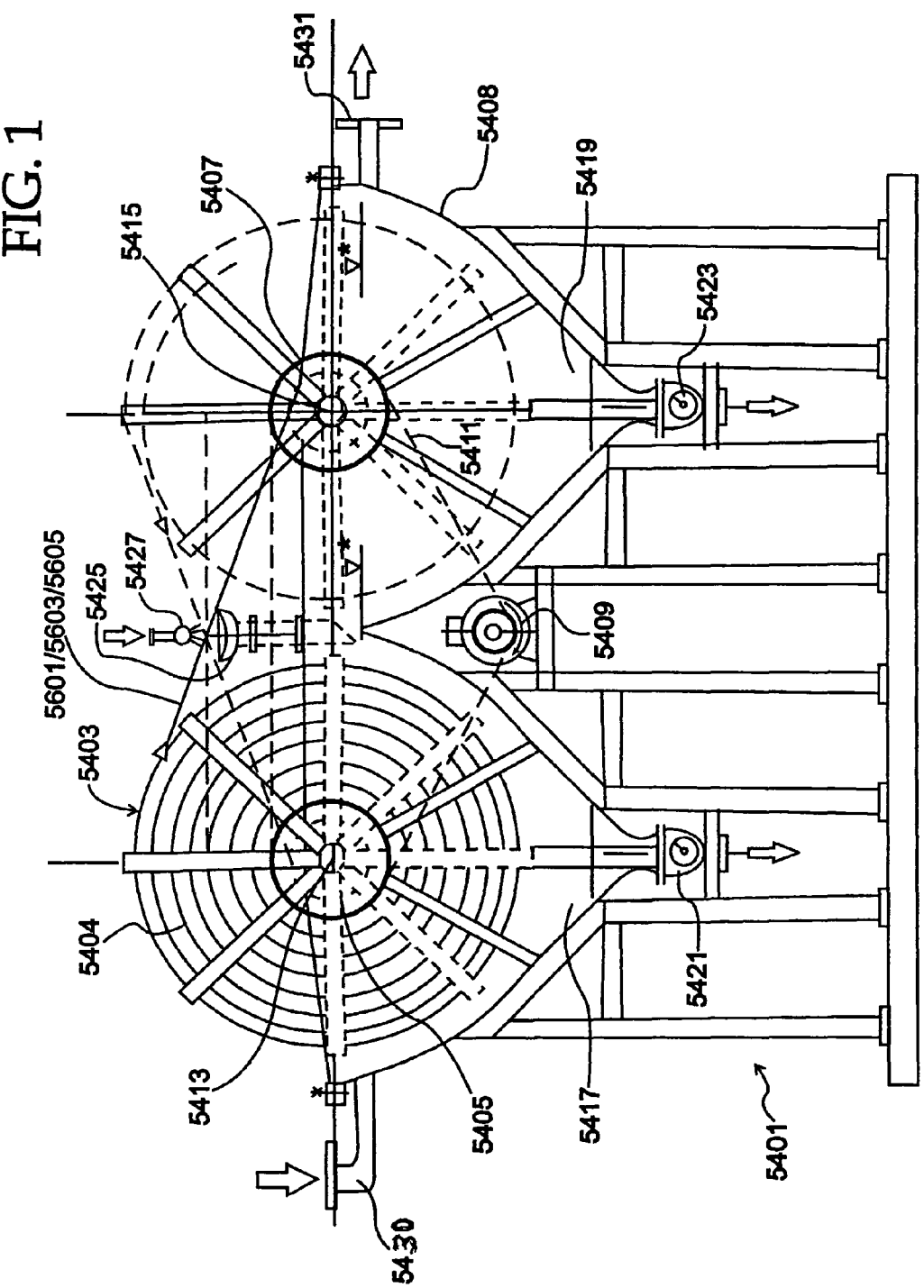
FIG. 1 is a side sectional view of a first embodiment of the rotating biological contactor treatment apparatus of this invention.
Figure 2:
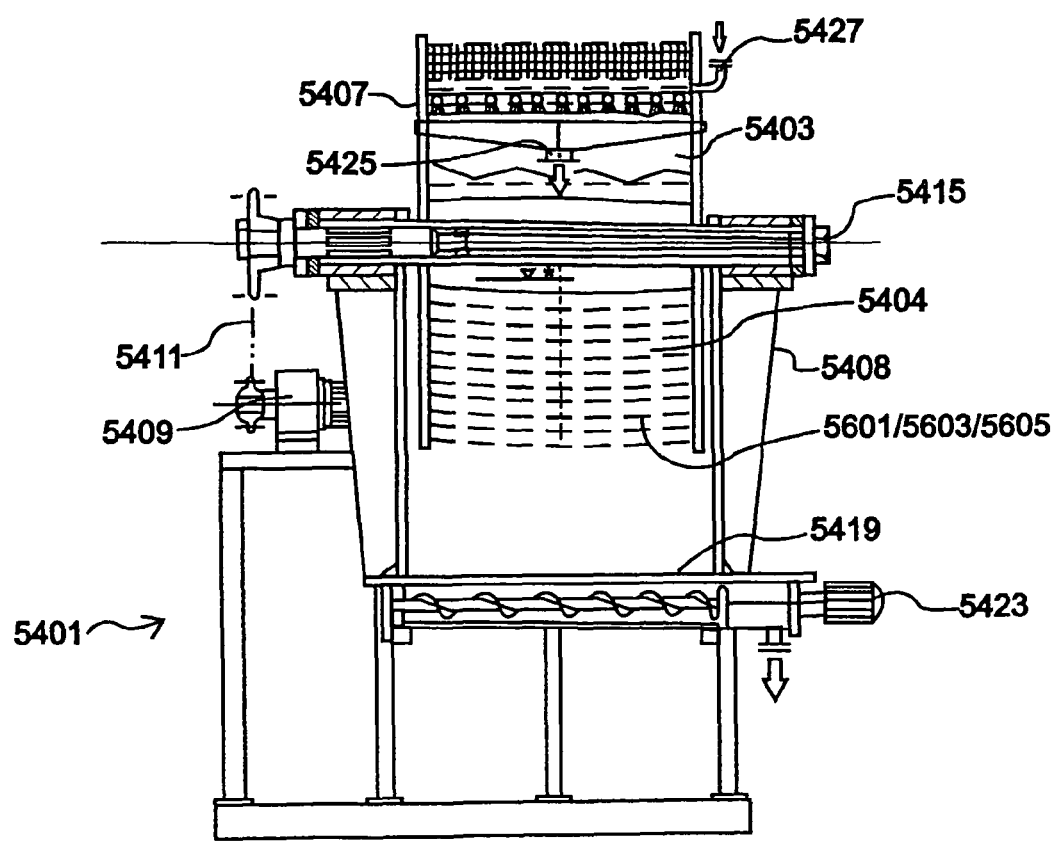
FIG. 2 is a second sectional side view of the apparatus of FIG. 1.
Figure 3:
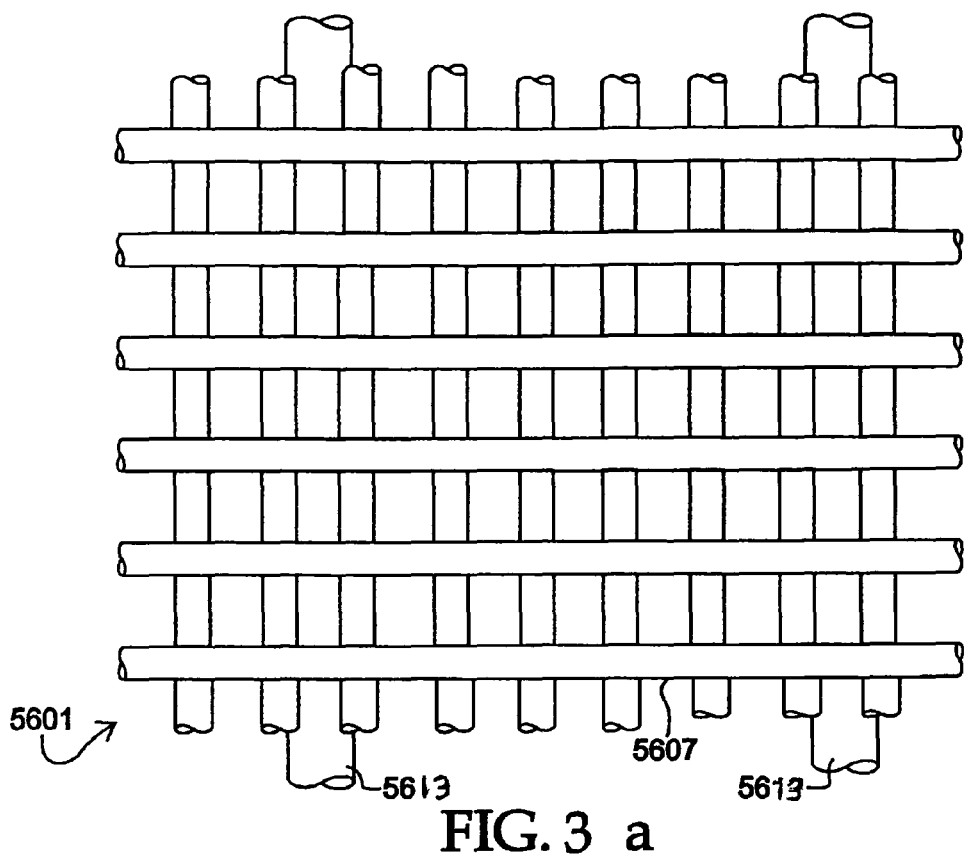
FIGS. 3a through 3c are illustrations showing various embodiments of conveyor contactor fabrics utilizable with the apparatus of this invention.
Figure 3:
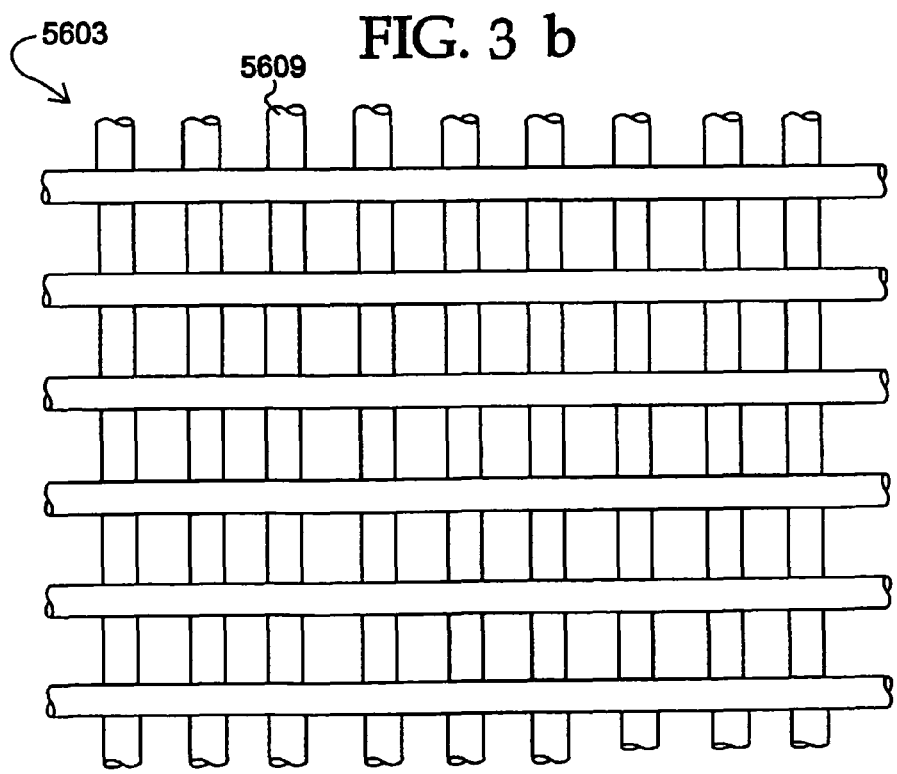
Figure 3:
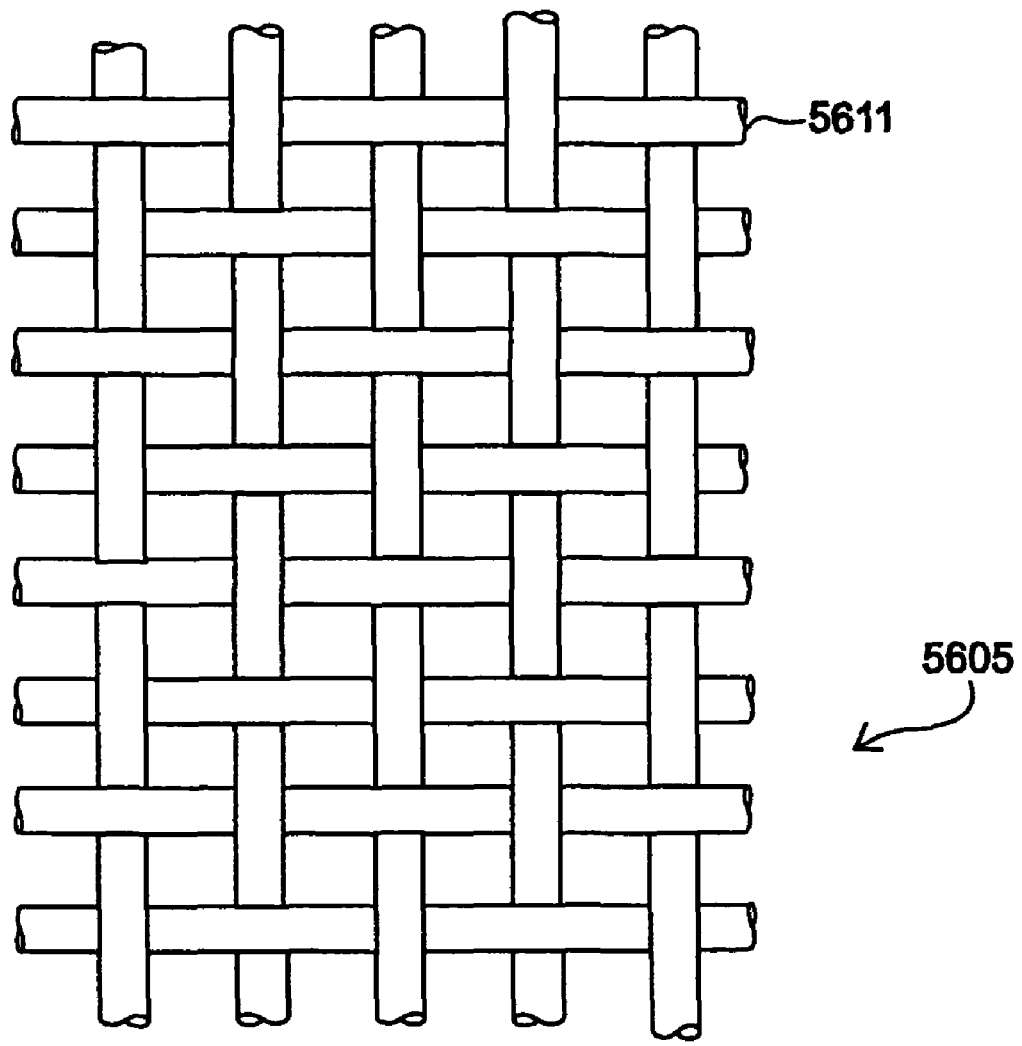
Figure 5:
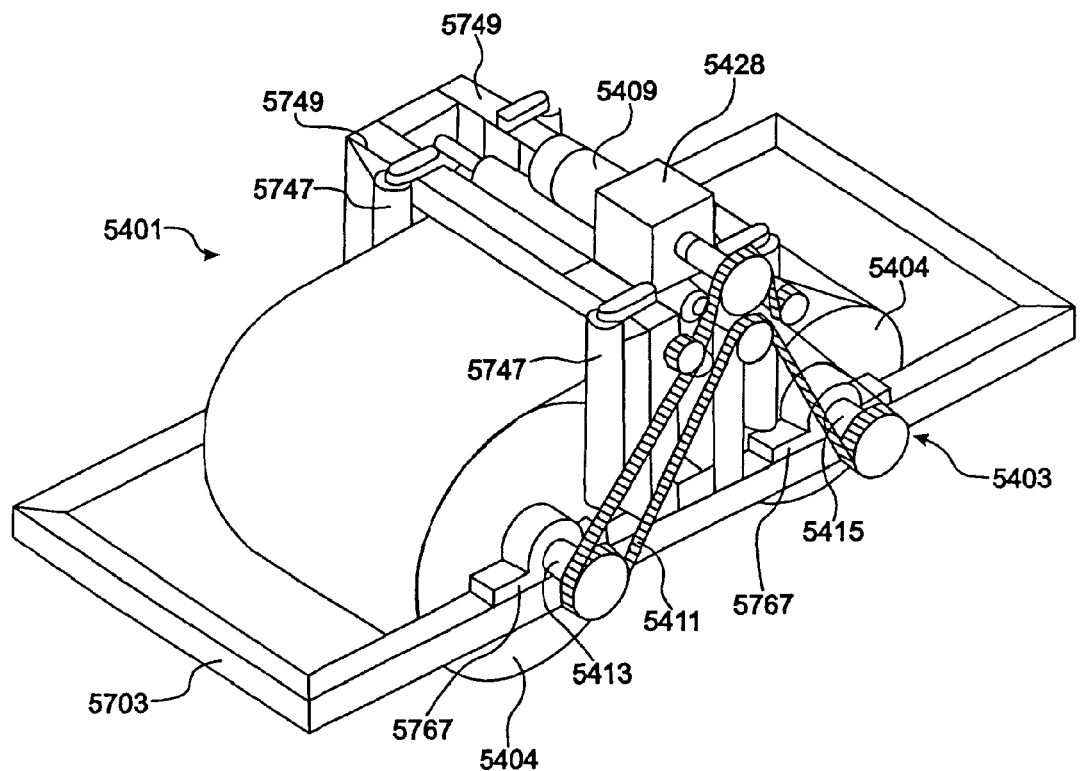
FIG. 5 is a perspective view showing the conveyor apparatus of the assembly illustrated in FIG. 4.
Figure 6:
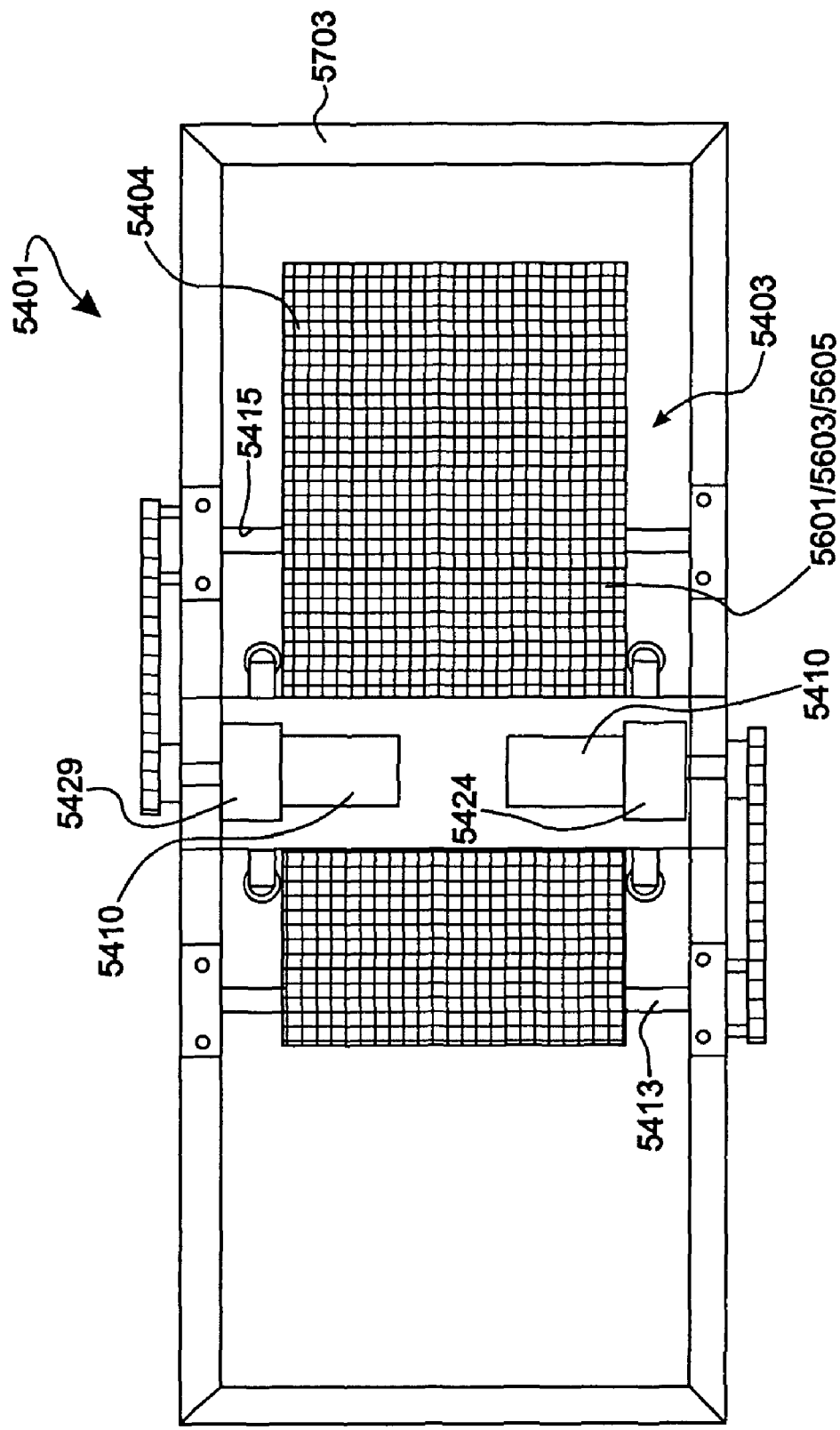
FIG. 6 is a top view of the another embodiment of the apparatus of this invention.
Figure 7:
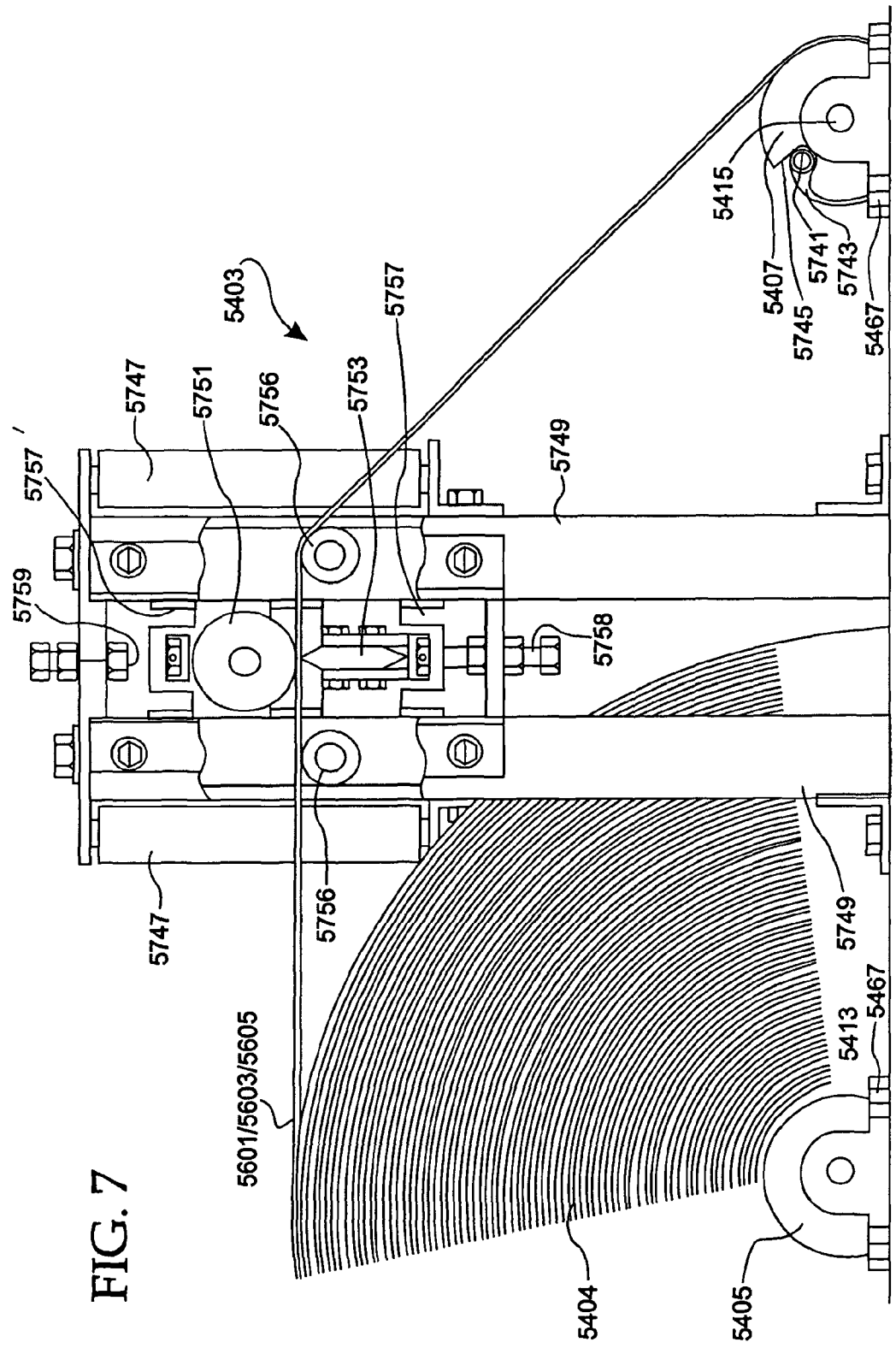
FIG. 7 is a partial side view of the apparatus of this invention.
Figure 8:
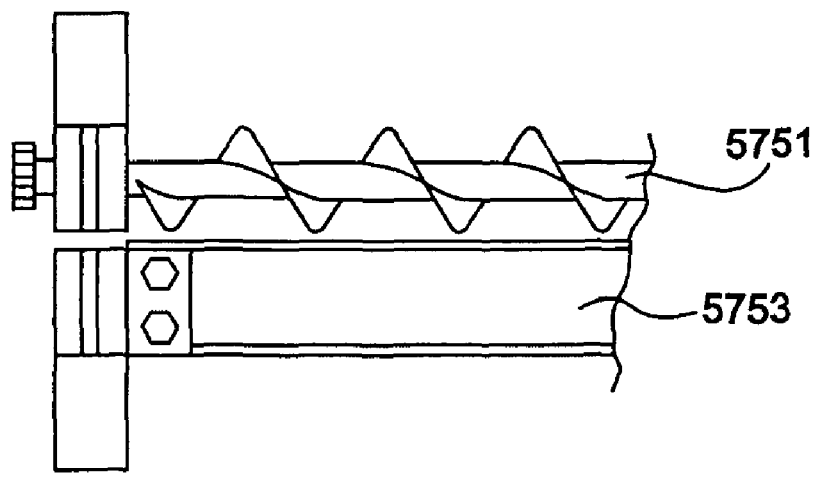
FIG. 8 is a partial end view of the apparatus as shown in FIG. 7.
Figure 10:
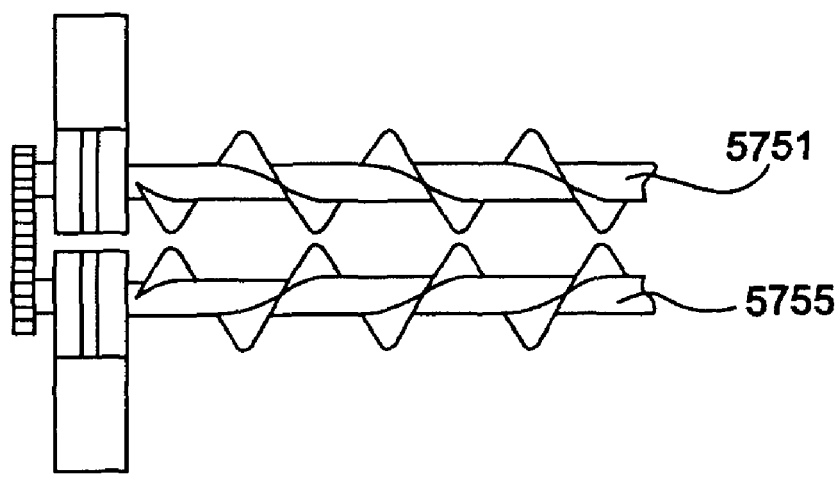
FIG. 10 is a partial end view of the apparatus as shown in FIG. 9.
Figure 9:
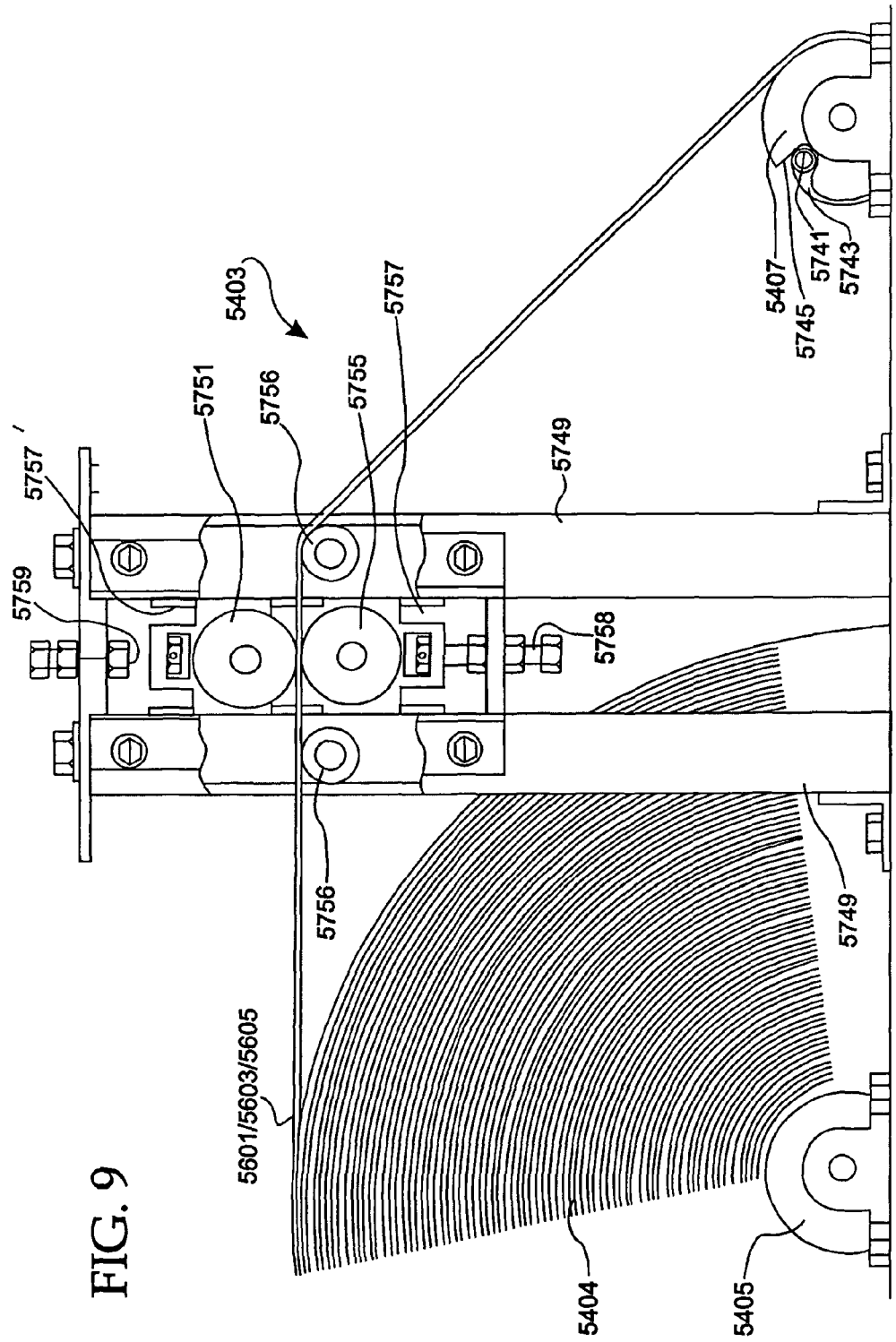
FIG. 9 is a partial side view of a second embodiment of that portion of the apparatus shown in FIG. 7.

The drums are mounted side by side in tank 5408 allowing alternating coiling and uncoiling of the belt material from one drum to the other (utilizing bi-directional motor 5409 as shown in the embodiments of FIGS. 1 and 5, or two independently controlled motors 5410 as shown in the embodiment of FIG. 6, connected by belt or chain drive 5411 with each of the drums). Motor 5409 is connected with a sensor switch or the like for reversing direction of rotation (not shown in FIG. 1). The bio-media rotates alternatingly perpendicular to the flow of the contaminated feed water. Drums 5405 and 5407 are carried on driven shafts 5413 and 5415, and compacted sludge draw-off at the bottom of tank cones 5417 and 5419 is conducted by screw conveyor/progressive cavity pump systems 5421 and 5423 (see also, FIG. 12). Removal of immobilized microorganisms to control activated sludge thickness of the conveyor belt occurs at variously configures mechanisms (for example, 5425 in FIGS. 1 and 2), and initial seeding or reseeding of microorganisms on belt material 5601/5603/5605 is via an insert (for example, 5427 in FIGS. 1 and 2).

The two horizontally spaced coil spools, or drums, 5405 and 5407 have the fabric media of coil(s) 5404 wound around them in an Archimedes' spiral mode. In other words, the Archimedean spirals are mirror images of each other. Both spirals go outwards. The left one forms a curve going to the left and the right one forms a curve going to the right. The conveyor is continuously spooling off and on, thus alternating the sense of rotation of the respective spools. As a result, its operating coil diameters continuously change (when the coil diameters are immersed, up to between 40% and 60% is exposed to the ambient air).

The inclined, unsupported free span of conveyor belt material between the two drums provides a place for continually sloughing off the excess biomass from the bio-sludge carrying conveyor belt material. This arrangement provides about a 40% larger active contact surface area over prior art devices, thus allowing a smaller footprint with equal or improved performance. Less energy is required by assembly 5401 due to a lesser rotating mass. Manufacturing costs are, likewise, reduced. Because of the larger active surface area, shorter treatment contact and retention times are required. The apparatus is easy to maintain and clean.

Belt material 5601/5603/5605 is preferably treated with genetically altered aerobe microorganisms, and is normally made of a plastic fabric material 5607/5609/5611 (from VERSEIDAG, for example, see FIGS. 3*a* through 3*c*). Often the fabric material is supported by a welded on rod support structure 5613 as shown in FIG. 56*a*, while still providing gaps for proper aeration to occur. The biological growth that becomes attached to conveyor belt material 5601/5603/5605 assimilates the organic materials in the wastewater. Aeration is provided by the alternating rotation of conveyor coil 5404, which exposes about 60% of the total conveyor area to the air after wastewater contact.

The extent of wastewater treatment is related to the amount of conveyor belt surface area and the quality and volume of the influent wastewater. Conveyor speed is a function of the continuously changing coil(s) diameter. To maintain a constant conveyor 5403 speed, the rotational speed of both drums 5405 and 5407 is controlled. Automatic drum speed control may be provided, for example, by means of a digital speed regulator consisting of a pulse generator (a driver sprocket or the like) that produces pulses in proportion to motor 5409 speed. An oscillator is used as a reference. Pulse generator and oscillator counts are compared and a corresponding error signal is fed to an analog regulator. Since both drums alternatingly coil on and off and, therefore, rotate at different speeds, both drums are equipped in one embodiment with clutches (ratchet-type, overrunning clutches for example). The clutches alternatingly overrun while coiling off, thus allowing drums to turn at different speeds. Other controls means as set forth hereinafter could be utilized.

Motor 5409 is incorporated in an assembly including a closed coupled gear reduction unit (5428 in FIG. 5 or, in pairs 5429, in FIG. 6, for example), and is preferably a reduced voltage starting, solid state technology to protect the driven load from mechanical shock, though other units could be utilized. The alternating reversal of motor 5409 may be accomplished, for example, by a PLC controlled solid state relay or other means. Influent feed flow is received at an inlet (5430 in FIG. 1, also where an aerated water stream of previously clarified effluent is introduced in a closed loop mode to facilitate iron and manganese precipitation, CH4 gas liberation and further expediting the sedimentation process within assembly 5401). Effluent is drawn off at an outlet (5431 in FIG. 1) for further treatment.

The biological treatment assembly and apparatus of this invention may be used in conjunction with selected pretreatment and post treatment options, either separately provided or integrated (as shown hereinafter), the selected options depending on the actual feed water to be treated. Pretreatment options may, if applicable, include oil separation, membrane aeration processes for enhanced iron and manganese precipitation, disposable fabric filtration, and/or feed homogenizing (utilizing a buffer tank or the like). After preliminary homogenizing treatment to achieve an acidity degree in the pH range of 6.5 to 7.0 and a temperature of between 15° and 30° C., the waste water to be treated is transferred to biological treatment assembly 5401. Post treatment may usefully include an integrated, flocculation enhanced in some applications, lamella separation process for the post sedimentation of the nitrified effluent.

Figure 4:
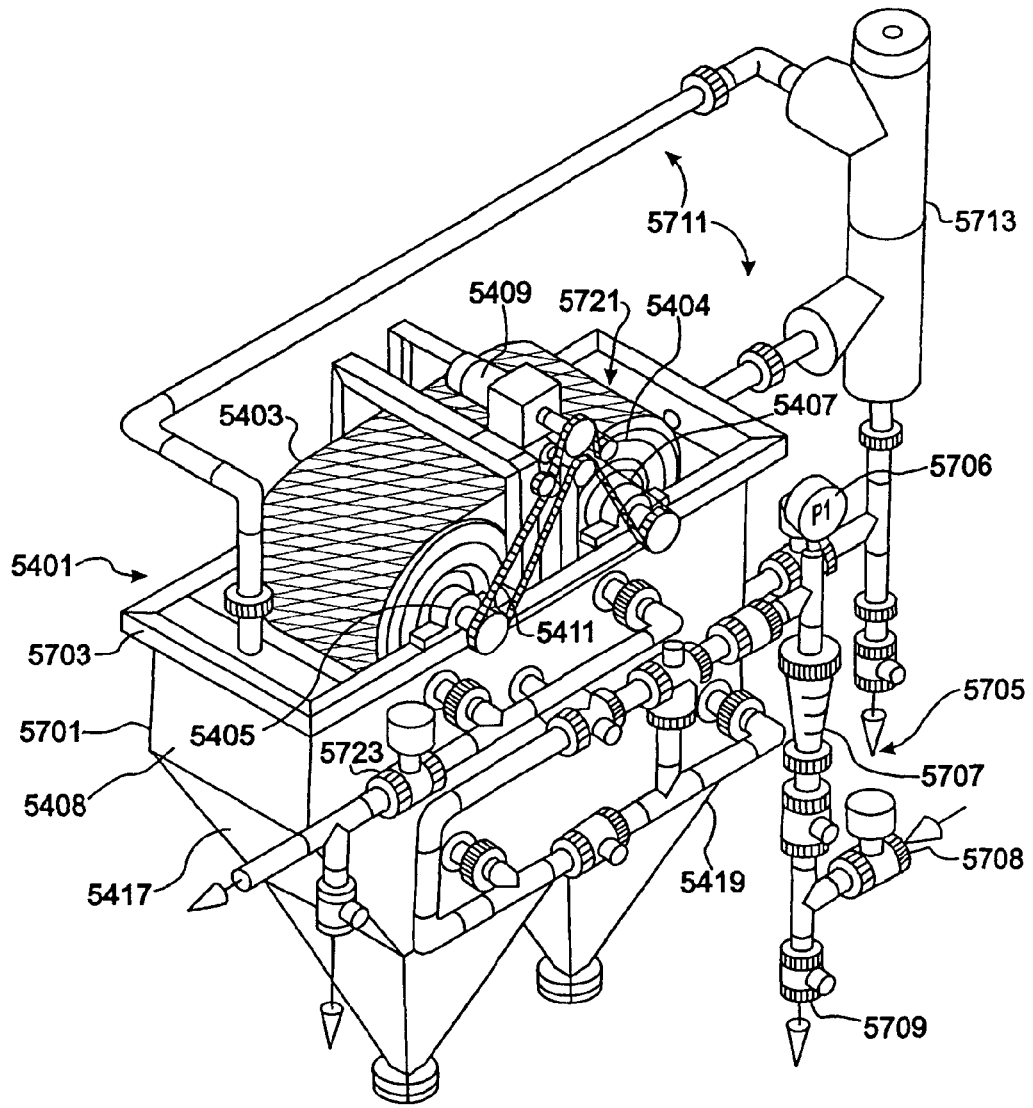
FIG. 4 is a diagrammatic illustration of a second and now preferred embodiment of the apparatus and assembly of this invention.
Figure 12:
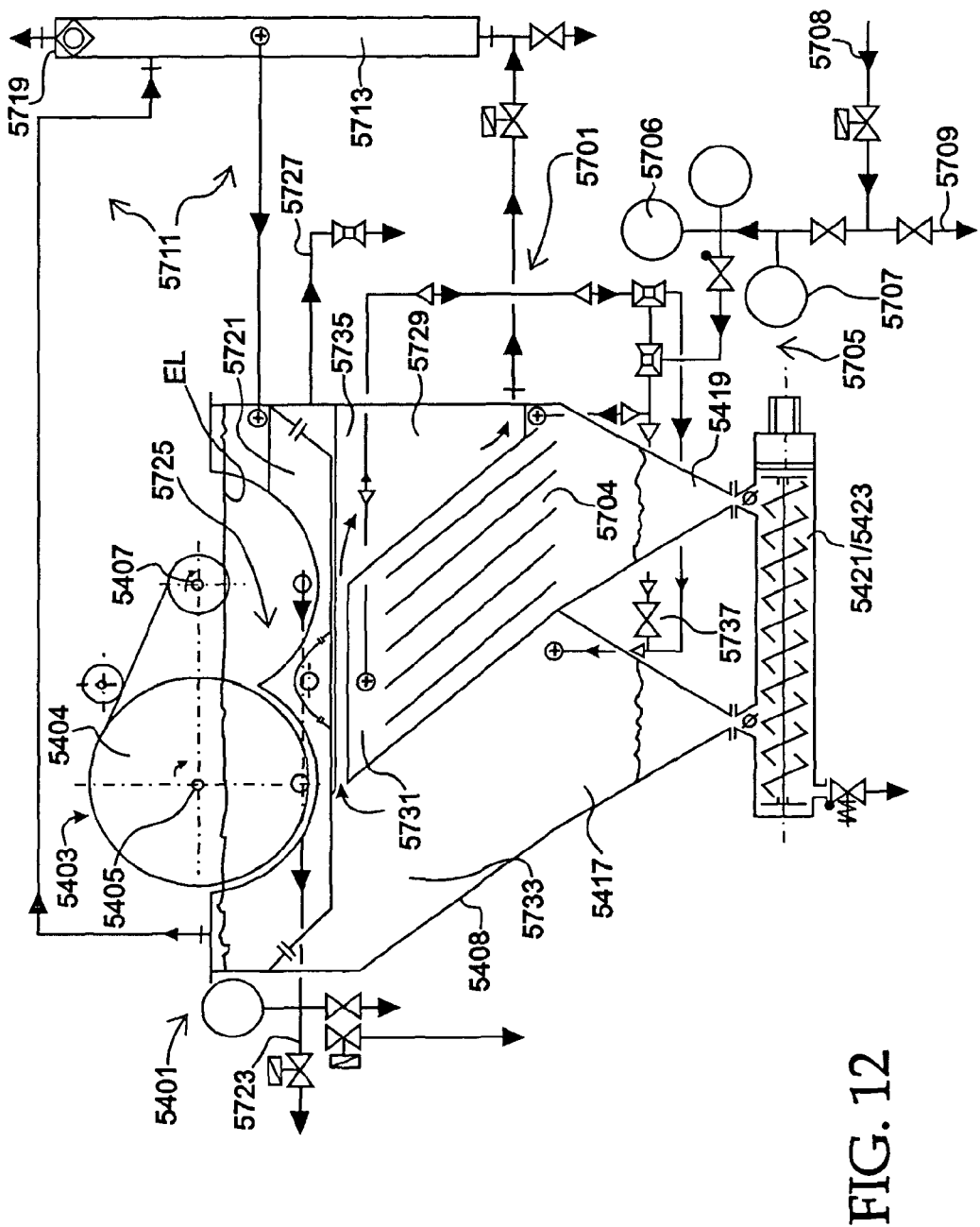
FIG. 12 is a sectional illustration of the tanks and clarifier portion of the apparatus and assembly of this invention.

FIGS. 4 and 12 are overviews showing the assembly of this invention—a biological treatment system. The system consists of a denitrification unit 5701 without moving parts and an integrated nitrification unit (immersed conveyor apparatus 5403) with moving parts which is mounted is support frame 5703 located on top of unit 5701. Denitrification unit 5701 employs an integrated lamella separator/clarifier assembly 5704

Pipe spool 5705 facilitates multiple treatment operational mode selection options for the particular wastewater including co-current mode of where the feed to assembly 5704 moves down together with the descending solids, counter current mode of operation where the assembly 5704 feed moves up against the descending solids, and separator assembly 5704 bypass mode. Spool 5705 also includes various gauges and monitoring equipment such as pressure gauge 5706 and flow indicator 5607. Feed supply input 5708 receives effluent to be treated (previously dosed, where applicable, with anaerobic cultures). Test sample port 5709 may be provided.

The anaerobic cultures for the denitrification process consist of microorganisms such as the following: bacterioiden, clostridiumen, methanosarcia barkeri, methane bacterium omelianskii, *methanococcus*, lipofil bacteria (fat bonding microbes), or the like. The specific microbial culture or cultures suitable is dependent on the specific water treatment requirements and will be determined by an onsite test. The test may produce varying results. However, at a minimum, for the anaerobic water treatment, about a 50% chemical oxygen demand reduction effect could be expected. Like every living thing, the microorganisms used in a biological treatment step die off and become waste residue. The residue forms slurry, a muddy substance, which is separated from the water by gravitation. The separation is expedited by means of the integrated assembly 5704.

Figure 13:
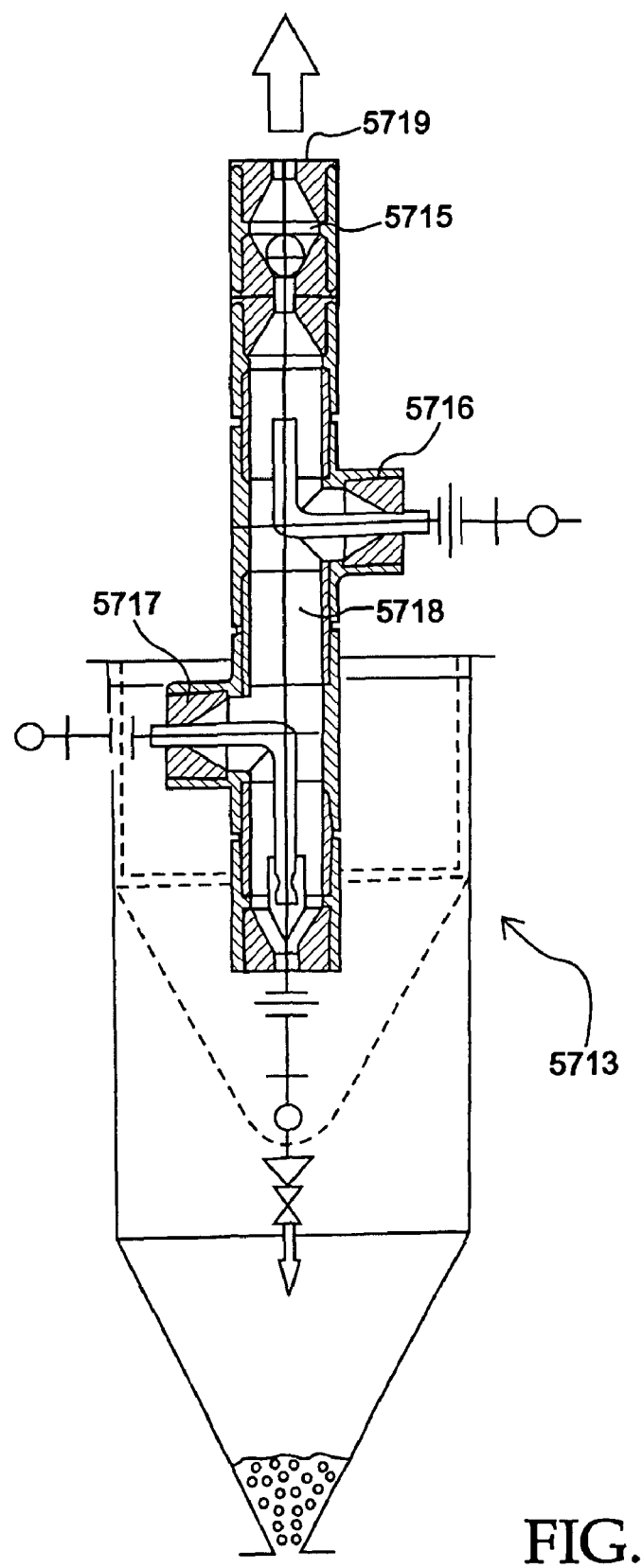
FIG. 13 is a sectional illustration showing the inline biogas liberator of utilized with the apparatus and assembly of this invention.

Transfer pipe spool 5711 provides a degassed denitrification effluent as an influent feed for integrated nitrification treatment processing at apparatus 5403. In-line degassing unit 5713 is maintained in transfer spool 5711. The degassing of the denitrification effluent takes place during the transfer cycle of the effluent to the nitrification apparatus 5403. A light vacuum by means of venturi action is applied to unit 5713, the controlled release of back pressure opening check valve 5715 (see FIG. 13). The digester gas in solution with the denitrified water is ascending into degassing unit 5713, while the free digester vent gas is ascending from an elevated portion 5716 above water transfer port 5717.

The digester gas in solution is now exposed to a atmospheric pressure environment in an increased area 5718 of pipe spool 5711, thus coming out of solution. The liberated ascending gas is combined with the free digester vent gas in the elevated portion of the degassing unit from where the combined gases are removed through outlet port 5719 for either disposal or collection (i.e., for cogeneration purposes).

The now degassed denitrified effluent enters through a shielded riser assembly into the feed distribution chamber 5721 of the nitrification unit.

Effluent withdrawal pipe spool 5723 is connected to the dual nitrification trough 5725 to facilitate drainage of the nitrified effluent. Spool 5723 is equipped with various valving for control and sampling. A surface foam outlet port 5727 is also provided. As shown in FIG. 12, apparatus 5403 is configured and located at trough 5725 so that effluent level (EL) maintained in the trough always results in contact with both coil 5404 portions at each of drums 5405 and 5407 without regard to the extent of coiling or uncoiling on a particular drum.

Feed transfer chamber 5729 is a dual function chamber depending upon the selected mode of operation of assembly 5701 as previously described. Chamber 5731 houses lamella assembly 5704, and is equipped, in its upper portion, to serve as a feed inlet and distribution chamber when the assembly 5704 is operated in co-current mode. Primary denitrification chamber 5733 serves as an assembly 5704 effluent inlet and distribution chamber, a primary denitrification chamber for assembly 5704 effluent, a denitrification effluent transfer chamber to denitrification effluent trough 5735, and a containment chamber for floating sludge and digester gas.

Sludge chambers 5417 and 5419 are an extension of denitrification chambers 5731 and 5733, the two funnel-shaped sludge chambers increasing the overall denitrification chamber volume while providing room and containment for sedimentation of denitrification sludges, precipitated matter and other suspended solids. The sedimentation product is periodically removed from the chambers as previously discussed.

Incoming feed pressure mixes effluent in chamber 5731, the effluent being transferred therefrom via valving 5737 to chamber 5733 where it is maintained for a selected residence time. New treatment effluent entering chamber 5733 pushing water out of chamber 5733 to trough 5735 and then to degassing unit 5713. From there, effluent is received at nitrification apparatus trough 5725 for aerobic treatment using apparatus 5403, the effluent distributed evenly into a selected volume (the dual nitrification trough 5725, for example, via a wolf tooth rake which also holds back the occasional carryover of solids).

Prior to transferring the denitrification effluent, dual nitrification trough 5725 needs to be drained to receive the fresh denitrification effluent for nitrification. After the adjustable nitrification time has expired, a controlled timer actuates the opening of a valve at outlet 5723. At the completion of the drainage cycle, a level switch triggers the closing of the valve. When the valve closes, an in-feed valve releasing denitrification effluent opens, a check valve preventing backflow from denitrification unit 5701. The denitrification influent is pushed into denitrification unit 5701 by means of either gravitational head pressure or an associated feed pump. The effluent displaces the primarily solid-free denitrification effluent out of the trough chamber 5735.

Once the maximum nitrification fluid level (EL) is reached, a controlled level switch first triggers the closing of the denitrification in-feed valve. On closing of the various effluent valves, actuation of the electro-mechanical drive of nitrification apparatus 5403 is triggered for initiation of the nitrification process. The integrated nitrification treatment process provides an aerobe biological treatment process to reduce a high Ammonium ($NH_4$) content and a high biological oxygen demand. Aerobic microorganisms require oxygen for their metabolism, and use the organic content, including the iron accepting bacteria of the wastewater, as an energy source to grow. The biological cultures used may consist of genetically altered and unaltered aerobic microorganisms. The aerobic cultures may consist of *escherichia coli*, organotrophe bacteria, *azotobacter, rhizobium, nitrosomonas nitrobacter*, and/or others. The biological nitrification is provided using the contactor apparatus 5403 as previously discussed having an immobilized biomass attached to a conveyor contactor fabric (5601/5603/5605).

Turning to the embodiment of apparatus 5403 shown in FIGS. 7 through 11, fabric conveyor 5601/5603/5605 of coil(s) 5404 is attached to both drums 5405 and 5407, attachment provided by retaining rods 5741. The rods are slipped through welded or otherwise formed conveyor end loops 5743, rods 5741 retained in notches 5745 of drums 5405 and 5407 (only shown with respect to drum 5407), protruding rod ends secured by a washer/retaining ring arrangement. Conveyor drums 5405 and 5407 should have a length approximately 2 inches longer for conveyors belts that measure 12 to 24 inches wide and 3 inches more for conveyor belts measuring over 24 inches wide.

As an option, four PVDF coated bio conveyor guide rollers 5747 (FIG. 7) could be provided to prevent belt run-off. Prime mover pedestals 5749 include right and left pedestals where the right mirrors the left. A right side prime mover pedestal is shown in FIG. 34. The pedestals are attached to main support frame 5703 (FIG. 5).

The vertical adjustment capability for precise bio-layer removal from conveyor belt upper-side is shown in FIGS. 7 through 11. Bio-layer deposit thickness on the conveyor belt material 5601/5603/5605 is directly proportional to the number of available coil layers around drums 5405 and 5407. Therefore, when the bio-layer thickness increases, the available coil numbers decrease for a fixed length of the bio conveyor. Thus, for any meaningful mode of operation, it is imperative that bio-layer thickness be controlled. The main portion of belt material 5601/5603/5605 is reached from the top by height adjustable rotating open flight screw conveyor 5751 for precise bio-layer removal, whereas the bio-layer thickness on belt material 5601/5603/5605 underside is controlled by either height adjustable scraper blade 5753 or height adjustable rotating open flight screw conveyor 5755. Belt material 5601/5603/5605 location/presentation is assured as coil(s) diameter changes by horizontal guide rollers 5756 coated with PVDF. Scraper blade 5753 or screw conveyor 5755 is attached to the lower portion of a wide slot ball bearing housing 5757 which is located at the lower portion of the ball bearing take-up frame and is movable by vertical adjustment bolt 5758. Screw conveyor 5751 is attached to the upper wide slot ball bearing housing 5757' and is movable by vertical adjustment bolt 5759.

Figure 11:
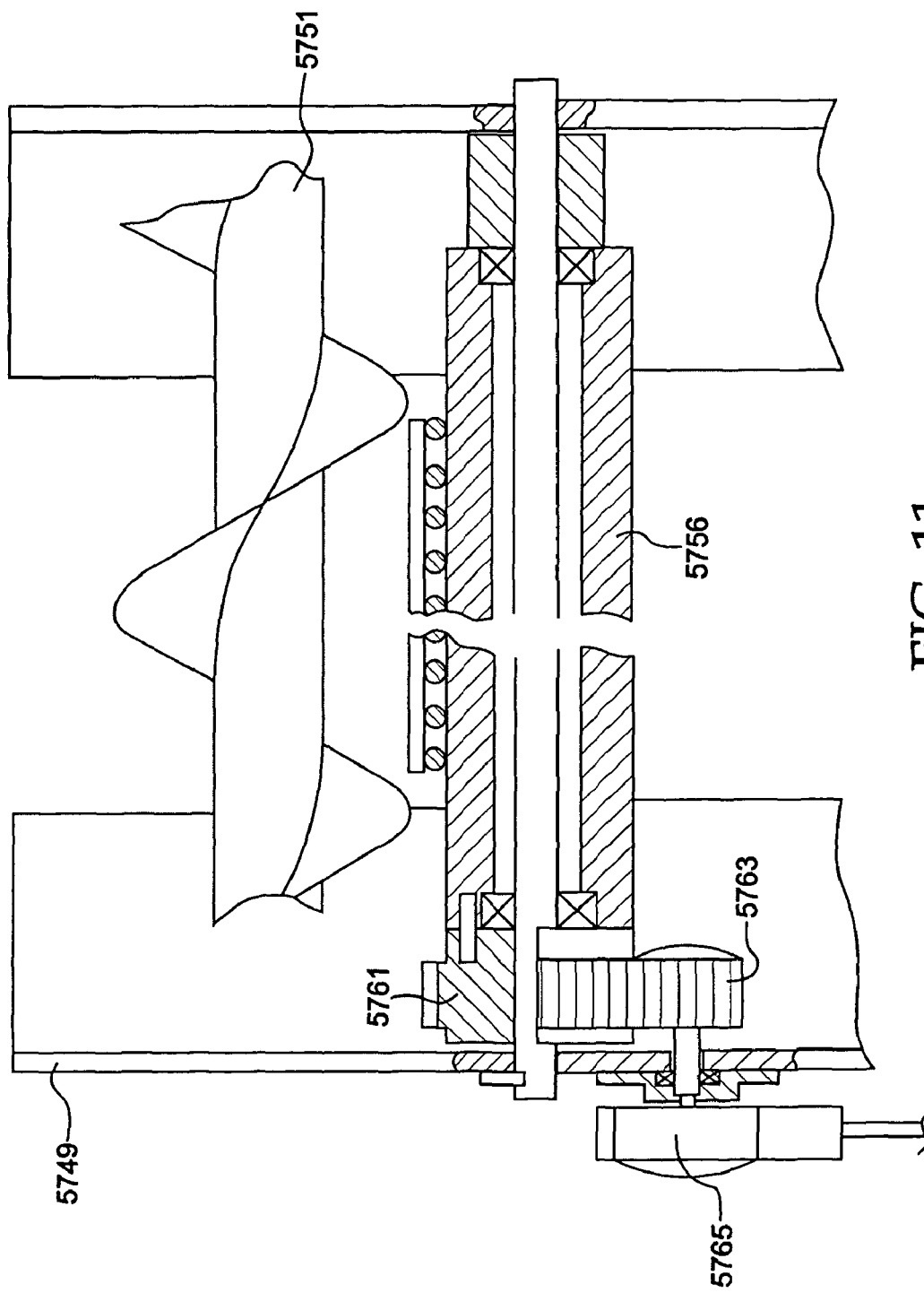
FIG. 11 is a partial sectional illustration of part of a drive configuration and bio-layer thickness control for the apparatus of this invention.

Guide rollers 5756 are transversely mounted in a parallel manner to drive shafts 5413 and 5415. In a preferred embodiment, one of guide rollers 5756 is a dual function guide roller and sensor drum for bio-conveyor velocity control, and is equipped for that purpose on one end with large diameter gear wheel 5761 (FIG. 11). Gear 5761 drives cogwheel accelerator gear 5763 which increases the pulse rate per revolution thus providing a high resolution for effective bio-conveyor velocity control. Accelerator gear 5763 drives tachometer generator 5765 which produces voltage information that is proportional to the coiling velocity of apparatus 5403. The voltage information is conditioned with a low pass filter for utilization as the sensing signal of the control loop discussed hereinafter.

The tachometer generator (for example a DART pulse generator PU-20E) provides 10 pulses for each revolution and the 5 volt square wave frequency provided is proportional to the guide roller/sensor drum 5756 and apparatus 5403 velocity respectively.

Rollers 5756 are mounted in such a position that at maximum coil 5404 diameter, apparatus 5403 is horizontally supported at all times while screw conveyor 5751 engages belt material 5601/5603/5605 from the top side and scraper 5753 (or screw conveyor 5755) makes contact on the underside. This set up provides an uninterrupted, constant bio-layer removal depth over the entire bio-conveyor operating length. Screw conveyor 5755 will have the same pitch as screw conveyor 5751, but an opposite helix, thus equalizing the direction of the transverse screw conveyor sliding forces and preventing the tendency of belt material 5601/5603/5605 to climb the vertical guide rollers.

Both screw conveyors get their motive force through the same type of power transmission element (chain or cog belt, or the like). The power transmission element connects both screw conveyor pulleys in a parallel manner, thus having the same sense of rotation. This setup causes resistance, but prevents any belt material 5601/5603/5605 advances in either spooling direction caused by screw conveyor operation. However, the added resistance provides the necessary bio-conveyor back tension to secure the proper on coiling process while at the same time facilitating a precise bio-layer thickness control operation. Depending on the nature of the biomass layer, a higher screw conveyor RPM range may be desired. The higher RPM range to the dual screw conveyor set up could be provided through a separate power source, which would work independently from the apparatus 5403 drive.

Another method of controlling the bio-layer thickness employs an air-powered piston vibrator. The vibrator is commercially available, and includes a single timer controlled impact unit providing the vibratory energy to shake off dead bio-mass from the belt material 5601/5603/5605. The units operate at low frequencies to avoid structural damage to the main drive system. The controlled vibratory energy output prevents transient vibration. Transient vibration could cause bio-layer compaction in the nonvibrated coils of the respective conveyor spools. Here, only a small portion of the unsupported conveyor span between the two horizontal guide rollers 5756 is vibrated.

Bio-layer thickness should be held to an overall (top and bottom) thickness of 1/16 inch to keep the outside diameter of the coils within reason. To start out (with no bio-layer on either side of the conveyor) only a reduced portion of the overall available conveyor belt material 5601/5603/5605 length is used. As the bio-layer builds up, more conveyor length is used until the maximum bio-layer thickness is reached at the maximum conveyor operating length, thus increasing the overall outside diameter of the conveyor coil. When the maximum bio-layer thickness is exceeded, the rotating open flight screw conveyor and scraper or screw conveyor remove the excess bio-layer. The removed biomass falls into the respective nitrification troughs 5725 and is carried out through the nitrification effluent spool. The carried out biomass is separated from the nitrified effluent by the post treatment assembly 5704 separation process, which could be enhanced through the known floccing techniques.

Depending on the size of unit 5403, the spool drums are adjusted and centered drive shafts 5413 and 5415 by means of a set screw or shaft collar arrangement. The spool drive shafts are supported on each end by self-aligning pillows block bearings 5767 mounted onto the main support frame 5703 as shown in FIG. 5.

In one embodiment, on the input drive side, shafts 5413 and 5415 are equipped with commercial overrunning clutches. Overrunning clutches are often referred to as "one-way" clutches. The clutches can drive in one direction and will overrun when driven in the opposite direction. Thus, while one conveyor coil 5404 spools on in a clockwise direction, the other conveyor coil 5404 overruns in a clockwise direction, and vice versa. The overrunning clutches are available from many suppliers including FORMSPRAG.

In the embodiment of apparatus 5403 shown in FIG. 6, the mechanical problems with the overrunning clutches is avoided. This method omits the overrunning clutches and the single prime mover method. Instead, each bio-conveyor spool barrel is powered by its own individual drive motor 5410 driving different ones of the shaft/drum/coil combinations. The two DC motors are operating simultaneously, but at differential speeds.

The on-coiling spool motor drive speed has to decrease over time to compensate for the gain of the on-coiling spool diameter size. Simultaneously, the off-coiling spool motor drive speed has to increase over time to compensate for the off-coiling spool diameter size loss. This provides a constant bio-conveyor velocity. Once the conveyor has fully transferred from the off-coiling spool onto the on-coiling spool, the spool barrel sense of rotation is reversed, which automatically triggers a reset step for the spool barrel revolution counter.

The control loops control the differential motor speeds and sense of drum rotations. The control loops are provided with a conditioned tachometer sensing signal from tachometer 5765. The signal is based on the actual conveyor velocity generated by the modified horizontal guide roller/sensor drum 5756.

Figure 14:
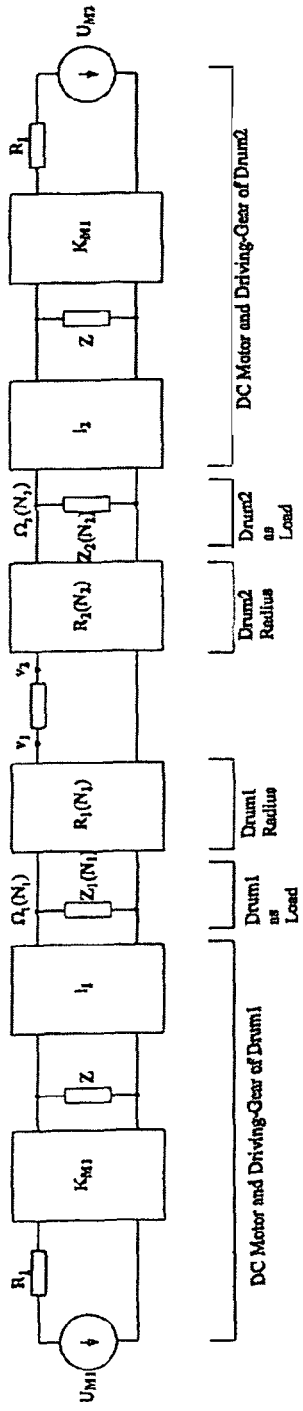
FIG. 14 is a block diagram illustrating operation of the apparatus in a first operational mode.
Figure 15:
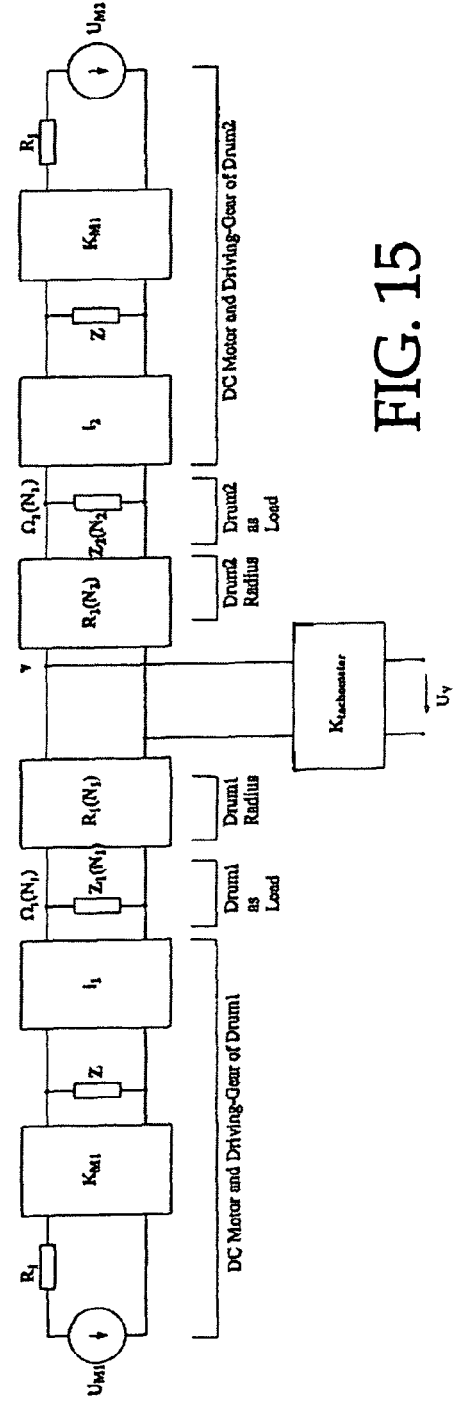
FIG. 15 is a block diagram illustrating operation of the apparatus in a second operational mode.
Figure 16:
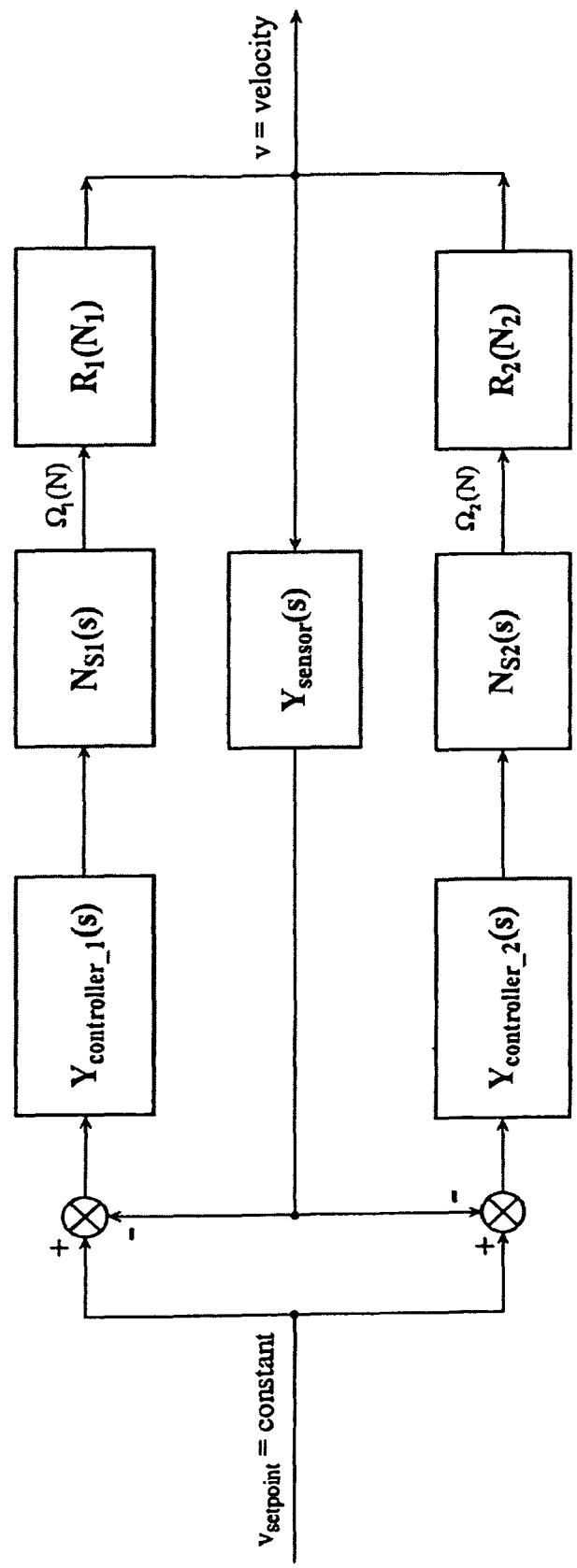
FIG. 16 is a block diagram of a nonlinear control system for the apparatus of this invention.
Figure 17:
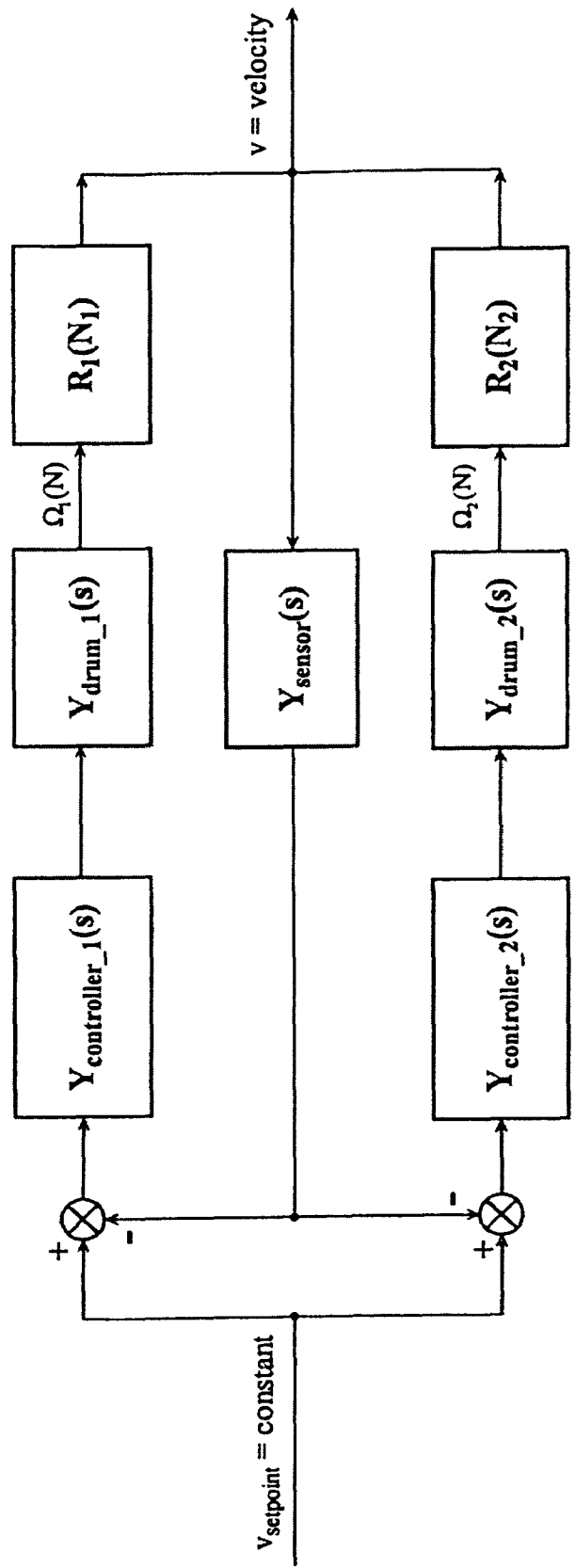
FIG. 17 is a block diagram of a linearized control system for the apparatus of this invention.

Turning to apparatus controls, FIG. 14 shows a dynamic conveyor apparatus 5403 velocity control process of this invention based on belt material 5601/5603/5605 having elasticity, whereas FIG. 15 shows a dynamic conveyor apparatus 5403 velocity control process of this invention based on belt material 5601/5603/5605 having no elasticity. FIG. 16 shows a non linear bio-conveyor velocity control system, while FIG. 17 shows a linearized control system.

When conveyor belt material is moving from left side drum 5405 to right side drum 5407, at the beginning the left side drum has a larger diameter. When the belt material is moved entirely from the left drum to right drum, the direction of rotation is reversed. Since movement from one drum to the other has to be done with constant velocity, each drum needs to have an independent control loop.

Initially, the number of revolutions of the drums $N_k$ (k=1, 2) are measured. When the direction of the velocity is changed the counters (of drum revolutions) are reset. We can define the rotated mass of drums and moment of inertia of the drums. The radius of drum $k^{th}$ at the number of material coil layers $N_k$:

$$R_k(N_k) = R_{k0} + N_k \cdot h$$

where $R_k(N_k)$ is radius of drum $k^{th}$ at the number of layers $N_k$ [m] (k=1, 2), $R_{k0}$ is the initial radius of drum $k^{th}$ [m], and H is thickness of belt material 5601/5603/5605 [m].

The mass of drum $k^{th}$ at the number of layers $N_k$:

$$m_k(N_k) = (R_k(N_k)^2 - R_{k0}^2) \cdot \pi \cdot b \cdot \rho_{textile} + R_{k0}^2 \cdot \pi \cdot b \cdot \rho_{drum}$$

where:

$m_k(N_k)$ is the mass of drum $k^{th}$ at the number of layers $N_k$ [kg] (k=1, 2), $R_k(N_k)$ is the radius of drum $k^{th}$ at the number of layers $N_k$ [m], $R_{k0}$ is the initial radius of drum $k^{th}$ [m], b is the width of belt material 5601/5603/5605 [m], $\rho_{textile}$ is the density of belt material 5601/5603/5605 [kg/m³], and $\rho_{drum}$ is the density of drums 5405/5407 material [kg/m³]

The inertia of drum $k^{th}$ at the number of layers $N_k$:

$$J_k(N_k) = m_k(N_k) \cdot \frac{R_k(N_k)^2}{2}$$

where:

$J_k(N_k)$ is the inertia of drum $k^{th}$ at the number of layers $N_k$ [kg·m²] (k=1, 2), $R_k(N_k)$ is the radius of drum $k^{th}$ at the number of layers $N_k$ [m], and $m_k$ is the mass of drum $k^{th}$ [kg].

The mass and inertia are nonlinear functions of the number of layers ($N_k$) on the actual drum. Belt material 5601/5603/5605 velocity is sensed at tachometer generator 5765 and the connected acceleration gear 5763 system. The tachometer generator produces voltage information that is proportional with this velocity. The voltage information is smoothed with a low pass filter and will serve as the sensing signal for the control loop.

FIG. 14 shows the dynamic model of a control system if material 5601/5603/5605 has elasticity. The drive motor and the appropriate gear mechanisms can be modeled with a proportional with one time constant block. In this block, the proportional amplification and the time constant can be calculated using the inertia and damping factor of each drum separately.

Thus, in FIG. 14, the mechanical impedance Z is taken into consideration:

$$Z = \frac{1}{s\left(\frac{J_m}{i^2} + J_h\right) + \frac{B_m}{i^2} + B_h}$$

where:

Z is the mechanical impedance of motor 5409 [rad/(N*m*s)], i is the gear mechanism of motor 5409, $J_m$ is the inertia of motor 5409 [kg·m²], $J_h$ is the inertia of the gear mechanism [kg·m²], $B_m$ is the damping factor of motor 5409 [N*m*s/rad], $B_h$ is the damping factor of the gear mechanism [N*m*s/rad], and s is the operator of Laplace transformation.

We can then calculate the mechanical impedances $R_k(N_k)$:

$$Z_k(N_k) = \frac{1}{s \cdot J_k(N_k) + B_k}$$

where:

$Z_k(N_k)$ is the mechanical impedance of drum $k^{th}$ with $N_k$ layer of textile [rad/(N*m*s)] (k=1, 2), $J_k(N_k)$ is the inertia of drum $k^{th}$ at the number of layers $N_k$ [kg·m²], $B_k$ is the damping factor of drum $k^{th}$ [N*m*s/rad], and s is the operator of Laplace transformation.

FIG. 15 shows control in the case where material 5601/5603/5605 has no any elasticity.

In FIG. 16, The left and right side drums have independent control loops but the set point value ($v_{setpoint}$) is common (constant).

The controlled variable (v=velocity) is sensed by a tachometer generator as before. The output signal (a voltage signal) is the control signal of the control loop. The functions of the blocks in FIG. 16 are:

$Y_{sensor}(s)$ is the transfer function of the sensing unit (consisting of the tachometer generator and a low pass filter; the time constant of the low pass filter is much less than the time constant of the apparatus); the transfer function of sensor unit is:

$$Y_{sensor}(s) = \frac{A_{sensor}}{1 + s \cdot T_{sensor}}$$

$Y_{controller\_k}(s)$ is the transfer function of controller of drum $k^{th}$ (k=1, 2); the transfer function of the controller is:

$$Y_{controller}(s) = A_p\left(1 + \frac{1}{s \cdot T_i} + \frac{s \cdot T_D}{1 + s \cdot T}\right)$$

$N_{Sk}(s)$ is the nonlinear transfer function of drum $k^{th}$ (k=1, 2); the linearized transfer function of the drum $Y_{drum}(s)$ is:

$$N_{Sk}(s) \approx Y_{drum}(s) = \frac{A_{drum}}{1 + s \cdot T_{drum}} e^{-sT_{delay}}$$

$R_k(N_k)$ is the radius of the drum as the function of number of textile layers (k=1, 2).

The transfer function of controllers $Y_{controllerk}$ (k=1, 2) have to produce on the base of quality of controlled signal a quick and accurate work. Our proposal is for this task a PID controller, where the P (proportional), D (differentiate) parts are responsible for the speed of control, and I (integrating) part gives the precision of the controlled signal.

The control system has to have the ability to sense the final state of material 5601/5603/5605 coiling (when one of the drums becomes empty). In this state the controller has to reverse the coiling and change the set point value ($v_{setpoint}$) to negative of the previous value.

The radius of coil(s) 5404 is changing as a function of the number of layers of material 5601/5603/5605 in the coil. The mass of the drum and inertia of the drum are functions of the radius so they are also changing. Thus the proportional (P), derivative (D) and integrate (I) values of the PID controller will be changing as a function of coil radius in a controlled loop. FIG. 17 shows a simplified control scheme for a liniarized control system.

Since a portion of the coils 5404 is always exposed to ambient air, an immobilized biofilm can be grown onto the surface of material 5601/5603/5605 fabric whereby the aerated outer layer of the biofilm of aerobe microorganisms, thereby securing the nitrification process $NH_4 \rightarrow NO_3$. The bio-cultures in the inner layer provide a post denitrification process $NO_3 \rightarrow N_2$.

As may be appreciated from the fore going, improved biological wastewater treatment is provided by this invention wherein a moving biological belt contactor is employed. The assembly, apparatus and methods of this invention are characterized by reduced manufacturing and operating costs, energy efficiency, reliability and stability. The assembly installation is marked by a relatively small footprint and is easily automated.

What is claimed is:

1. An apparatus for biological wastewater treatment comprising:
   a volume for receiving wastewater for treatment;
   a contactor including a coiled belt having a porous fabric media surface for receipt and growth of selected microbial cultures thereon; and
   structure moving said surface of said contactor through said volume.

2. The apparatus of claim 1 wherein said structure is configured to move said contactor so that said surface is exposed to ambient air periodically.

3. The apparatus of claim 1 further comprising speed control means for controlling velocity of said contactor.

4. The apparatus of claim 1 wherein said surface of said contactor is coated with a material to at least either promote faster and stronger adherence of the microbial seedlings at said surface or to function as a catalyst for conversion of organic and inorganic contaminants.

5. The apparatus of claim 1 wherein said coiled belt is a long sheet of said fabric media connected at one end to a first spool and at an opposite end to a second spool.

6. The apparatus of claim 1 wherein said coiled belt is coiled and uncoiled on first and second spools operatively connected with said structure.

7. The apparatus of claim 5 wherein said spools are positioned so that said coiled belt at each of said spools is in contact with the water being treated in said volume without regard to size of coil remaining at said spools during movement of said coiled belt between spools.

8. An assembly for biological wastewater treatment comprising:
   a tank having a volume for receipt of wastewater to be treated;
   a belt contactor including first and second ends and a surface therebetween for establishing selected microbial cultures thereon;
   first and second drum structures positioned at said tank, each for holding a different one of said ends of said belt contactor;
   means for rotating said drum structures in first and second directions to coil and uncoil said belt contactor on said drum structures, said first drum structure coiling said belt contactor and said second drum structure uncoiling said belt contactor in said first direction of rotational operation, the reverse occurring in said second direction of rotational operation;
   bio-layer thickness control structure adjacent to said belt contactor for removal of excess bio-layer buildup at said belt contactor; and
   whereby said belt contactor surface is moved through said tank volume on said first and second drum structures.

9. The assembly of claim 8 wherein said drum structures each include a drive shaft thereat, and wherein said means for rotating said drum structures includes a bidirectional motor linked with said drive shafts.

10. The assembly of claim 8 wherein said drum structures and said means for rotating said drum structures are mounted at a main support frame, said frame mounted atop said tank.

11. The assembly of claim 8 wherein said means for rotating said drum structures includes first and second motors each linked with a different one of said drum structures and speed control means for controlling relative rotational speed of said motors independently from one another.

12. The assembly of claim 8 wherein said belt contactor is made of a woven or fabricated fabric material.

13. The assembly of claim 8 wherein said tank has plural chambers in communication with one another including at least a dual trough chamber for receipt of thereat of said drum structures adjacent to different parts thereof, a denitrification chamber, and a chamber for receipt of a lamella clarifier.

14. The assembly of claim 8 wherein said bio-layer thickness control structure includes at least one of a scraper and a screw conveyor.

15. The assembly of claim 8 wherein belt contactor has a second surface with selected microbial cultures established thereon and wherein said bio-layer thickness control structure includes first and second controllers each active at a different one of said surfaces.

16. A method for biological wastewater treatment comprising:
   moving water to be treated into a volume;
   moving material having a porous fabric media surface with selected microbial cultures established thereon between first and second coils adjacent to said volume;
   exposing part of said surface of said material to the water to be treated during material movement; and
   exposing another part of said surface of said material at each of said coils to ambient air.

17. The method of claim 16 wherein the step of exposing another part of said surface to ambient air includes exposing said surface of said material moving from said first to said second coil to air during movement thereof between said coils.

18. The method of claim 16 wherein the step of exposing part of said surface to the water includes exposing portions of each of said coils to the water to be treated.

19. The method of claim 16 further comprising the step of denitrification of water to be treated prior to movement into said volume.

20. The method of claim 16 further comprising the step of degassing water to be treated prior to movement into said volume.

21. The method of claim 16 further comprising the step of at least partly clarifying treatment water before, during or after movement into said volume.

22. The method of claim 16 further comprising the step of controlling rate of movement of said material between said coils.

23. The method of claim 16 further comprising monitoring and controlling bio-layer buildup thickness on said moving material surface and removing excessive buildup.

* * * * *